2,937,284

2,4-DIAMINO-5,6-DIALKYLPYRIDO (2,3-d) PYRIMIDINES AND METHOD

George H. Hitchings, Yonkers, and Kurt W. Ledig, New Rochelle, N.Y., assignors to Burroughs Wellcome & Co. (U.S.A.) Inc., Tuckahoe, N.Y., a corporation of New York No Drawing. Application May 1, 1958
Serial No. 732,126

5 Claims. (Cl. 260—256.4)

This invention relates to a novel group of 2,4-diaminopyrido(2,3-d)pyrimidines which are highly active against a variety of pathogenic bacteria. The new group of substances is characterized chemically by alkyl substitutions in the 5- and 6-positions of the pyrido-(2,3-d)pyrimidine system and may be represented by the following formula:

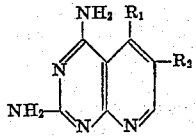

wherein $R_1$ and $R_2$ are selected from the group consisting of lower alkyl radicals providing that together they may represent one of the divalent, trimethylene and tetramethylene radicals. The new substances are considerably more potent than the group of pyrido(2,3-d)pyrimidines of the copending application U.S. Serial No. 707,854. In the previous work it was possible to prepare 5,7- and 6,7-disubstituted derivatives but the 5,6-dialkyl derivatives were unattainable by the method used. The invention, accordingly, contemplates a novel method for the preparation of derivatives of the indicated formula.

That the new derivatives are of considerably greater importance is attested by their superior activities as compared with the related derivatives as shown by the following representative tests:

INHIBITORY EFFECTS OF PYRIDO(2,3-d)PYRIMIDINES ON BACTERIA

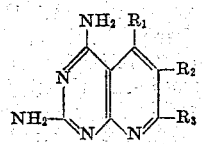

| $R_1$ | $R_2$ | $R_3$ | Zone of Inhibition (mm.) | | |
|---|---|---|---|---|---|
| | | | E. coli | S. aureus | E. typhosa |
| CH$_3$ | C$_3$H$_7$ | H | 32.5 | 16 | 39 |
| H | C$_2$H$_5$ | C$_2$H$_7$ | 19 | 14 | 0 |
| (CH$_2$)$_3$ | | H | 32.5 | 15 | 39 |
| H | (CH$_2$)$_3$ | | 21 | 0 | 0 |
| (CH$_2$)$_4$ | | H | 35 | 14 | 32 |
| CH$_3$ | C$_4$H$_9$ | ---- | 30.5 | 20 | 25 |
| ---- | CH$_3$ | C$_4$H$_9$ | 17 | 21 | 0 |

Many applications of the above findings will be apparent to those skilled in the art. The substances may be used topically in lotions and ointments in concentrations of 0.1 to 1 percent to inhibit bacterial growth. In addition they potentiate the sulfonamides and so may be used in combination with the latter to enhance their effectiveness.

The new substances are prepared by a new route. 2,4,6-triaminopyrimidine reacts with a suitable acylacetate to form a 2,4-diamino-5,6-dialkyl-7-hydroxypyrido-(2,3-d) pyrimidine. This is converted successively to the 7-chloro and 7-mercapto derivative then to the desired 7-unsubstituted derivative. These reactions are illustrated below:

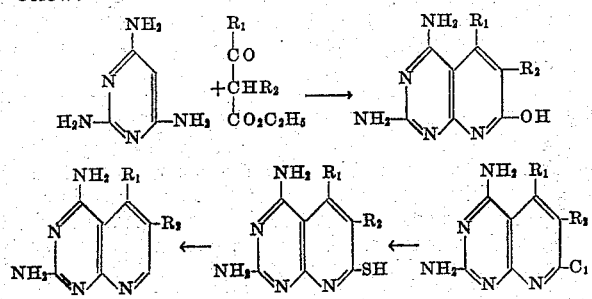

The teachings of this application are illustrated in the following examples; the scope, however, is defined in the claims.

PYRIDO(2,3-d)PYRIMIDINES

*Example 1.—2,4-diamino-7-hydroxy-5-methyl-6-propyl-pyrido(2,3-d)pyrimidine*

Thirty grams of 2,4,6-triaminopyrimidine was heated with 100 ml. of ethyl-n-propylacetoacetate in an oil bath kept at 240–250° and the low-boiling fraction was distilled off during the reaction, over a period of 45 minutes. Finally, the reaction mixture was subjected to vacuum distillation to remove the excess ester. The cooled residue was ground up with methyl alcohol, filtered, leached with water and refiltered.

Twenty-five grams of the crude product was refluxed with 1 liter acetic acid+100 ml. acetic anhydride for 4 hours followed by complete evaporation of the solvent. The monoacetyl derivative was refluxed with 300 ml. of phosphorus oxychloride for 0.75 hour and evaporated to a small volume. The mixture was poured over ice, neutralized with ammonium hydroxide and the precipitate of 2,4 - diamino-5-methyl-6-propyl-7-chloropyrido(2,3-d) pyrimidine was filtered.

The wet cake was heated with 200 ml. of 2 N NaSH overnight at 140° in a steel bomb. The resulting precipitate of 2,4-diamino-5-methyl-6-propyl-7-mecaptopyrido-(2,3-d) pyrimidine was filtered and washed with water.

Ten grams of the crude 7-mercapto compound was heated under reflux conditions in 1 liter 95% alcohol, with 100 ml. of ammonium hydroxide and 50 g. of Raney nickel catalyst for 12 hours. After addition of a further 50 g. of Raney nickel refluxing was continued for another 12 hours to complete the reaction. The filtrate was evaporated on the steam bath and the residue dissolved in 100 ml. of water with the addition of 2 N HCl, filtered and the clear filtrate made alkaline with sodium hydroxide. The resulting 2,4-diamino-5-methyl-6-propylpyrido-(2,3-d)pyrimidine was recrystallized from 70% alcohol. Its ultraviolet absorption spectrum showed a maxima at 320 and 330 (inflection) m$\mu$ at pH 1 and 341 and 350–370 (inflection) m$\mu$ at pH 11.

*Example 2.—2,4-diamino-5-methylpyrido(2,3-d) pyrimidine*

Twenty-five grams of 2,4,6-triaminopyrimidine was refluxed with 250 ml. of acetoacetic ester for 1 hour. Refluxing was so arranged that the low distilling fraction which was formed, distilled off at 64–77°. The reaction mixture was cooled and the precipitate collected.

The crude product was refluxed in 750 ml. acetic acid in the presence of 100 ml. of acetic anhydride for 4 hours. After evaporating to dryness the acetylated 2,4-diamino-5-methyl-7-hydroxypyrido(2,3-d)pyrimidine was refluxed with 200 ml. of phosphorus oxychloride for 3 hours. The reaction mixture was evaporated, and the residue was diluted with chloroform followed by neutralization with gaseous ammonia. The reaction mixture was filtered from inorganic material and the filtrate evaporated to dryness. Ten grams of the 7-chloro product was treated with 150 ml. of 2 N NaSH at 145° in a steel bomb for 14 hours. The reaction mixture was filtered and the precipitate washed with water. The 2,4-diamino-5-methyl-7-mercapto compound was filtered and reprecipitated from dilute sodium hydroxide solution by the addition of acetic acid.

Two grams of the 7-mercapto derivative was refluxed with 250 ml. of 95% alcohol, 50 ml. of concentrated ammonium hydroxide and about 5 g. of Raney nickel for 6 hours. After this time another portion of 5 g. of Raney nickel catalyst and a few ml. of ammonium hydroxide were added and the refluxing was continued overnight. The reaction mixture was filtered to remove the Raney nickel which was washed with 95% alcohol and the combined filtrate and washings were evaporated to about 150 ml. The addition of 2 N HCl dissolves the 2,4-diamino product, which was then precipitated by the addition of sodium hyroxide. It was recrystallized from 95% alcohol, yielding 500 mg. of 2,4-diamino-5-methyl-pyrido(2,3-d)pyrimidine with a melting point of 320°.

*Example 3.—2,4-diamino-5,6-tetramethylenepyrido (2,3-d)pyrimidine*

Twenty-four grams of 2,4,6-triaminopyrimidine was heated with 70 g. of cyclohexanone 2-ethylcarboxylate in an oil bath at 220–240° for 30 minutes. During this time the low-boiling fraction distilled off, after which the reaction mixture was subjected to vacuum to remove the excess ester. The residue was dissolved in 200 ml. of concentrated sulfuric acid at 50° and the solution was poured over ice. The resulting precipitate was collected and triturated with dilute ammonium hydroxide.

Twenty-three grams of the above crude 2,4-diamino-5,6-tetramethylene-7-hydroxypyrido(2,3-d)pyrimidine was refluxed in 1 liter acetic acid with 100 ml. of acetic anhydride for 3 hours and the resulting acetyl derivative was recovered by filtration.

Eighteen grams of the acetylated product was boiled under reflux conditions for 30 minutes with 180 ml. of phosphorus oxychloride. The clear solution was evaporated to small volume and poured over ice. The solution was neutralized with ammonium hydroxide and filtered. The moist cake was treated with 300 ml. of 2 N NaSH and heated overnight in a steel bomb at 140°. The resulting yellow precipitate was collected and dissolved in dilute sodium hydroxide and reprecipitated by the addition of acetic acid.

Two grams of the above 7-mercapto compound was refluxed in 250 ml. of 95% alcohol and 50 ml. of ammonium hydroxide with 5 g. of Raney nickel. After three hours, another portion of 50 ml. ammonium hydroxide and 5 g. of Raney nickel catalyst was added and refluxed for another 12 hours. The solution was filtered and the Raney nickel was washed well with hot alcohol. The combined solutions were evaporated on the steam bath. The residue was dissolved in 20 ml. of water with the addition of a few ml. of HCl. The clear solution was treated with Darco and after filtration brought to pH 10 with sodium hydroxide. The 2,4-diamino-5,6-tetramethylenepyrido (2,3-d)pyrimidine was purified by recrystallization from 95% ethyl alcohol. Its ultraviolet absorption spectrum showed maxima at 270 (inflection), 323 and 335–375 m$\mu$ (inflection) at pH 1 and 265 (inflection) and 342 m$\mu$ at pH 11.

*Example 4.—2,4-diamino-5-propylpyrido(2,3-d) pyrimidine*

Thirty grams of 2,4,6-triaminopyrimidine was heated in an oil bath at 230–240° with 100 g. of ethyl butyrylacetate for 30 minutes during which time the low-boiling fraction was distilled off. The reaction mixture was treated as in Example 1 and the subsequent steps carried out in the same way as in Example 1, except the mixture of chloro derivative and sodium hydrosulfide was heated at 155° for 12 hours. The product was characterized by its ultraviolet absorption spectrum: pH 1, 270 m$\mu$; 312 m$\mu$; 345–360m$\mu$ (inflection) and pH 11, 265 m$\mu$ (inflection), 338 m$\mu$.

*Example 5.—2,4-diamino-5-methyl-6-butylpyrido(2,3-d) pyrimidine*

Thirty grams of 2,4,6-triaminopyrimidine was treated with 100 g. of ethyl-$\alpha$-butylacetoacetate as in Example 1.

The residue was treated with 1000 ml. of acetic acid and 100 ml. of acetic anhydride under reflux conditions as in Example 1, and the acetylated 2,4-diamino-6-butyl-7-hydroxy-5-methylpyrido(2,3-d)pyrimidine boiled under reflux conditions with 350 ml. of phosphorus oxychloride. The reaction mixture was worked up as in Example 1.

The wet cake then was heated in a steel bomb at 155° overnight with 600 ml. of 2 N NaSH solution. The resulting precipitate was dissolved in 650 ml. of 1 N sodium hydroxide by warming, and the clear solution was acidified with acetic acid. Ten grams of 2,4-diamino-6-butyl-5-methyl-7-mercaptopyrido(2,3-d)pyrimidine was boiled under reflux conditions with vigorous agitation in the presence of 10 g. of potassium carbonate in 1 liter of water and 30 g. Raney nickel catalyst for 4 hours. Another 30 g. of Raney nickel was added and boiled for another 2 hours to complete the reaction. The product was isolated as in Example 1 and was recrystallized from 80% alcohol. Ultraviolet absorption spectrum $\lambda$ max.=275 m$\mu$, 325 m$\mu$ and 355m$\mu$ (inflection) at pH 1 and 260–270 m$\mu$ (inflection) and 338 m$\mu$ at pH 11.

*Example 6.—2,4-diamino-5,6-trimethylenepyrido(2,3-d) pyrimidine*

Twenty-five grams of 2,4,6-triaminopyrimidine was treated with 75 g. of cyclopentanone 2-ethylcarboxylate as in Example 1.

Ten grams of the product was acetylated in 100 ml. acetic anhydride and 1 liter of acetic acid. After evaporating the solvent the residue was treated with 250 ml. phosphorus oxychloride in a reflux condition and the isolated crude 2,4-diamino-5,6-trimethylene-7-chloropyrido(2,3-d)pyrimidine was reacted with 2 N NaSH as in Example 1, except that the reaction was carried out at a temperature of 155°. Four grams of 2,4-diamino-5,6-trimethylene-7-mercaptopyrido(2,3-d)pyrimidine was reacted with 10 g. of Raney nickel catalyst in 500 ml. of 95% alcohol in the presence of 50 ml. of ammonium hydroxide. The crude 2,4-diamino-5,6-trimethylenepyrido(2,3-d)pyrimidine was recrystallized from 95% alcohol.

Ultraviolet absorption spectrum: pH 1, 321–322 m$\mu$ and 350–370 m$\mu$ (inflection); pH 11, 260–270 m$\mu$ (inflection) and 345 m$\mu$.

What we claim is:

1. A 2,4-diaminopyrido(2,3-d)pyrimidine of the formula

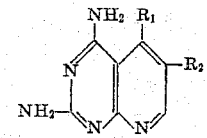

wherein $R_1$ and $R_2$ are selected from the group consisting of lower alkyl radicals and together are selected from the group consisting of the divalent trimethylene and tetramethylene radicals.

2. 2,4-diamino-5-methyl-6-butylpyrido(2,3-d)pyrimidine.

3. 2,4-diamino-5-methyl-6-propylpyrido(2,3-d)pyrimidine.

4. 2,4-diamino-5,6-trimethylenepyrido(2,3-d)pyrimidine.

5. 2,4-diamino-5,6-tetramethylenepyrido(2,3-d)pyrimidine.

References Cited in the file of this patent

FOREIGN PATENTS 774,095 Great Britain _____ May 8, 1957

OTHER REFERENCES

Klisiecki et al.: Roczniki Chem., vol. 3, pp. 251–260 (1923).